United States Patent [19]

Oliver

[11] Patent Number: 5,682,422
[45] Date of Patent: Oct. 28, 1997

[54] APPARATUS AND METHOD FOR ON-DEMAND ACTIVATION OF TELEPHONE LINE TELEMETRY DEVICES

[75] Inventor: Stewart Warner Oliver, Venice, Calif.

[73] Assignee: International Teldata Corporation, Chicago, Ill.

[21] Appl. No.: 519,821

[22] Filed: Aug. 25, 1995

[51] Int. Cl.$^6$ .................................................. H04M 11/00
[52] U.S. Cl. ...................... 379/107; 379/142; 340/870.02
[58] Field of Search ....................................... 379/106, 107, 379/90, 93, 97, 98, 142; 340/870.01, 870.02

[56] References Cited

U.S. PATENT DOCUMENTS

| | | |
|---|---|---|
| 4,180,709 | 12/1979 | Cosgrove et al. . |
| 4,489,220 | 12/1984 | Oliver . |
| 4,540,849 | 9/1985 | Oliver . |
| 4,578,536 | 3/1986 | Oliver et al. . |
| 4,654,868 | 3/1987 | Shelley ..................................... 379/107 |
| 4,654,869 | 3/1987 | Smith et al. ............................. 379/107 |
| 4,710,919 | 12/1987 | Oliver et al. . |
| 4,833,618 | 5/1989 | Verma et al. . |
| 4,839,917 | 6/1989 | Oliver . |
| 4,866,761 | 9/1989 | Thornborough et al. . |
| 5,134,650 | 7/1992 | Blackmon . |
| 5,189,694 | 2/1993 | Garland . |
| 5,197,095 | 3/1993 | Bonnet et al. ............................. 379/107 |
| 5,202,916 | 4/1993 | Oliver . |
| 5,204,896 | 4/1993 | Oliver . |
| 5,234,644 | 8/1993 | Garland et al. . |
| 5,235,634 | 8/1993 | Oliver . |
| 5,311,581 | 5/1994 | Merriam et al. ........................ 379/106 |
| 5,377,260 | 12/1994 | Long ........................................ 379/142 |
| 5,485,509 | 1/1996 | Oliver . |
| 5,488,654 | 1/1996 | Oliver . |

OTHER PUBLICATIONS

May 8, 1993 "Outline Specification For A Meter Interface Unit for use with PSTN No Ring Calls" by K.E. Nolde, BT Laboratories.

Primary Examiner—Wing F. Chan
Attorney, Agent, or Firm—Fitch, Even, Tabin & Flannery

[57] ABSTRACT

A telemetry device is provided which communicates over a phone line to a central host station. The telemetry device includes a plurality of meter ports. In one embodiment, the host station transmits a data activating signal to the telemetry device. The data activating signal instructs the telemetry device to read consumption information from a designated one of the meter ports. The consumption information is then transmitted back to the host station. In another embodiment, one of a plurality of host stations transmits a data signal to the telemetry device. The data signal instructs the telemetry device as to which one of the plurality of host stations to call to provide an on-demand reading of a meter port.

62 Claims, 8 Drawing Sheets

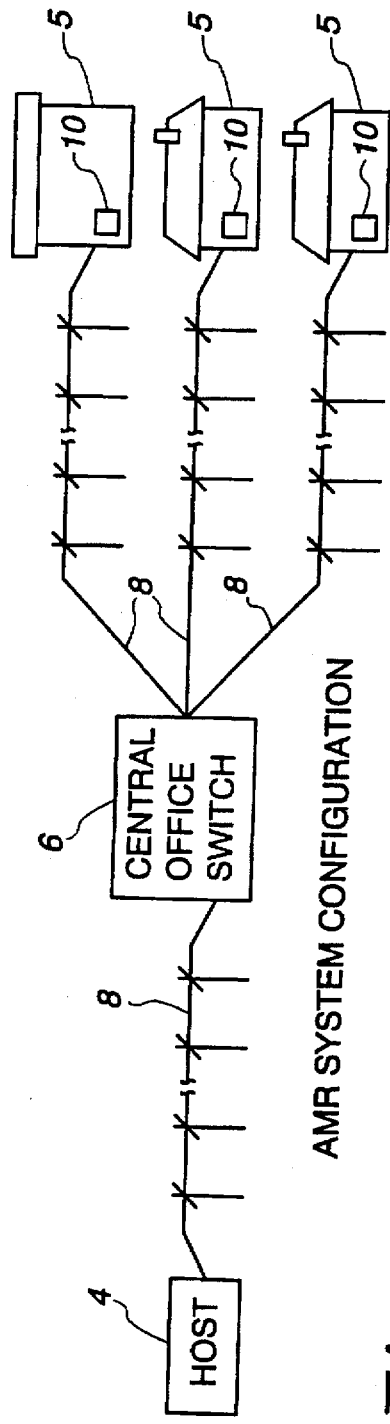
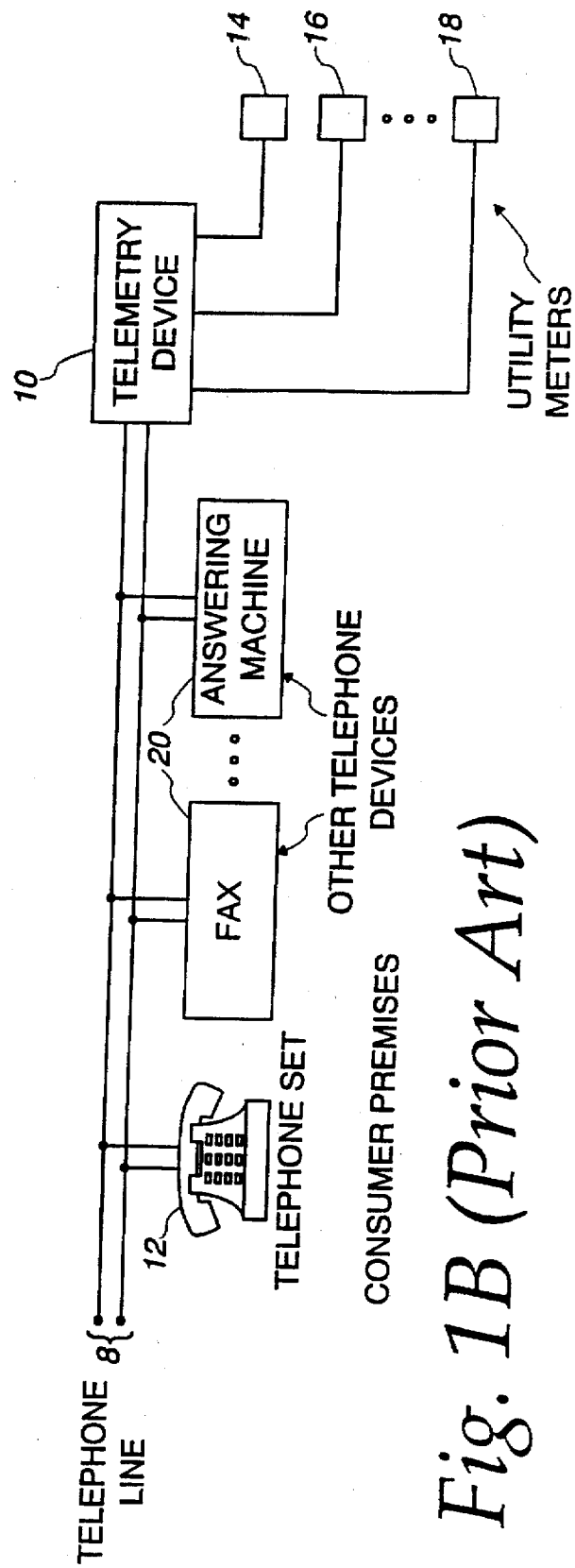
Fig. 1A (Prior Art)
Fig. 1B (Prior Art)

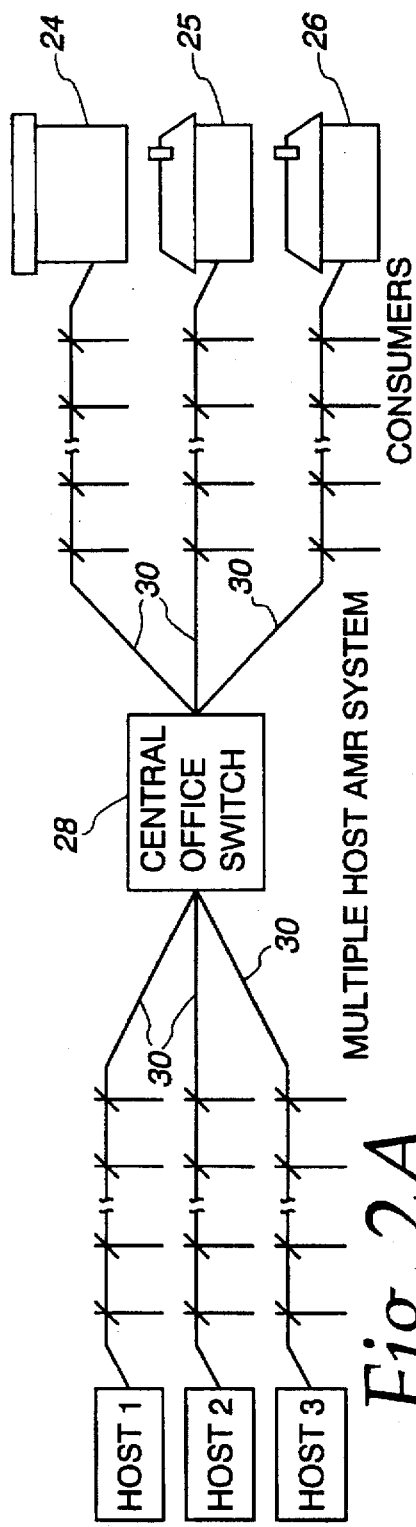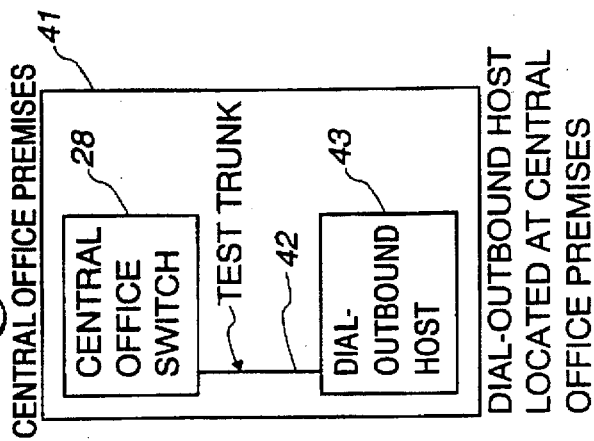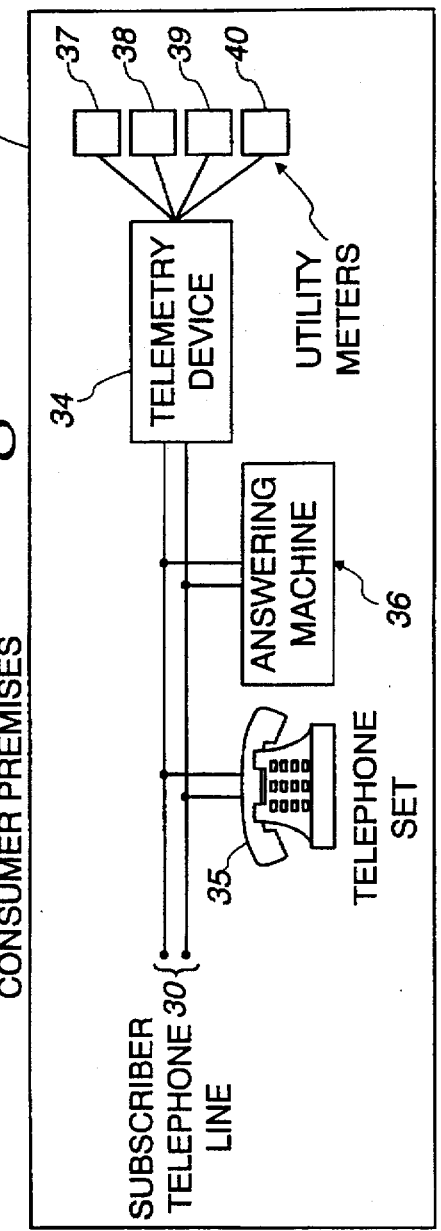

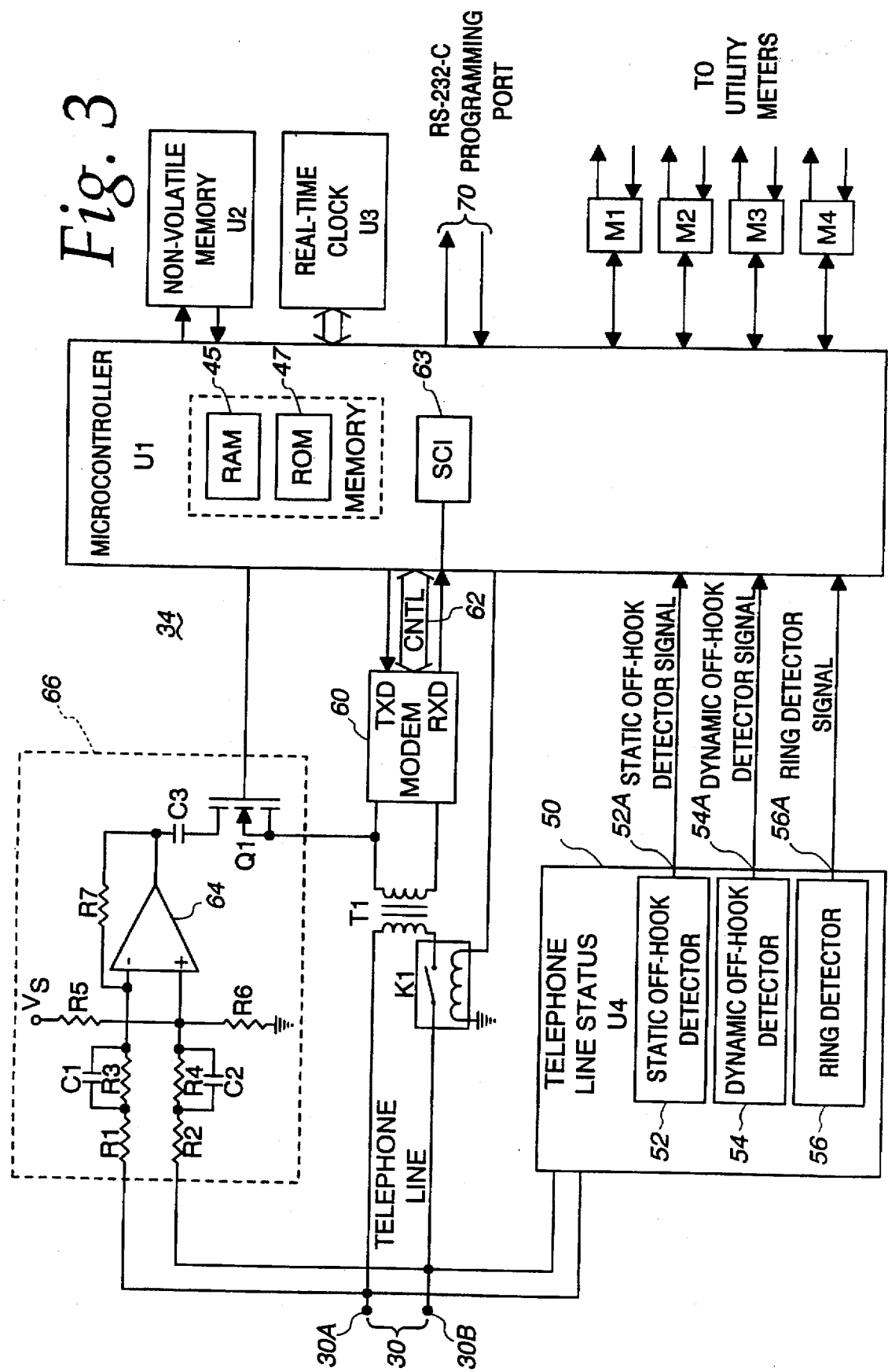

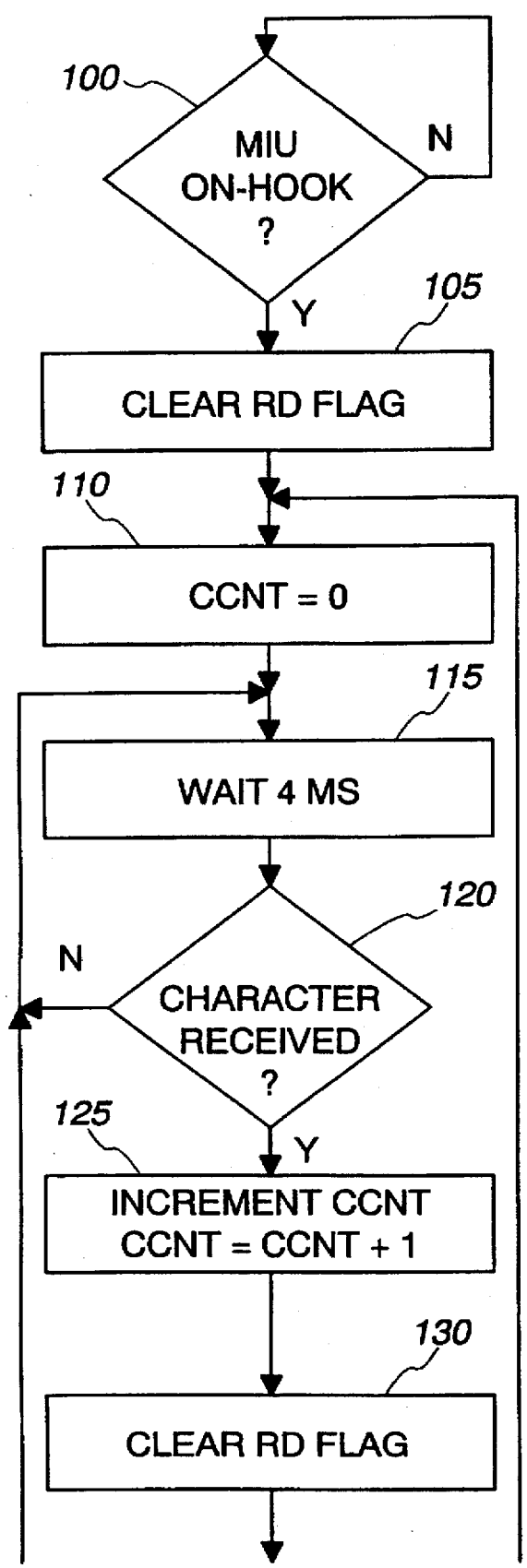
Fig. 4A
Fig. 4
Fig. 4A
Fig. 4B

DIAL-OUTBOUND MIU ACTIVATION

DIAL-INBOUND MIU ACTIVATION
Fig. 6A
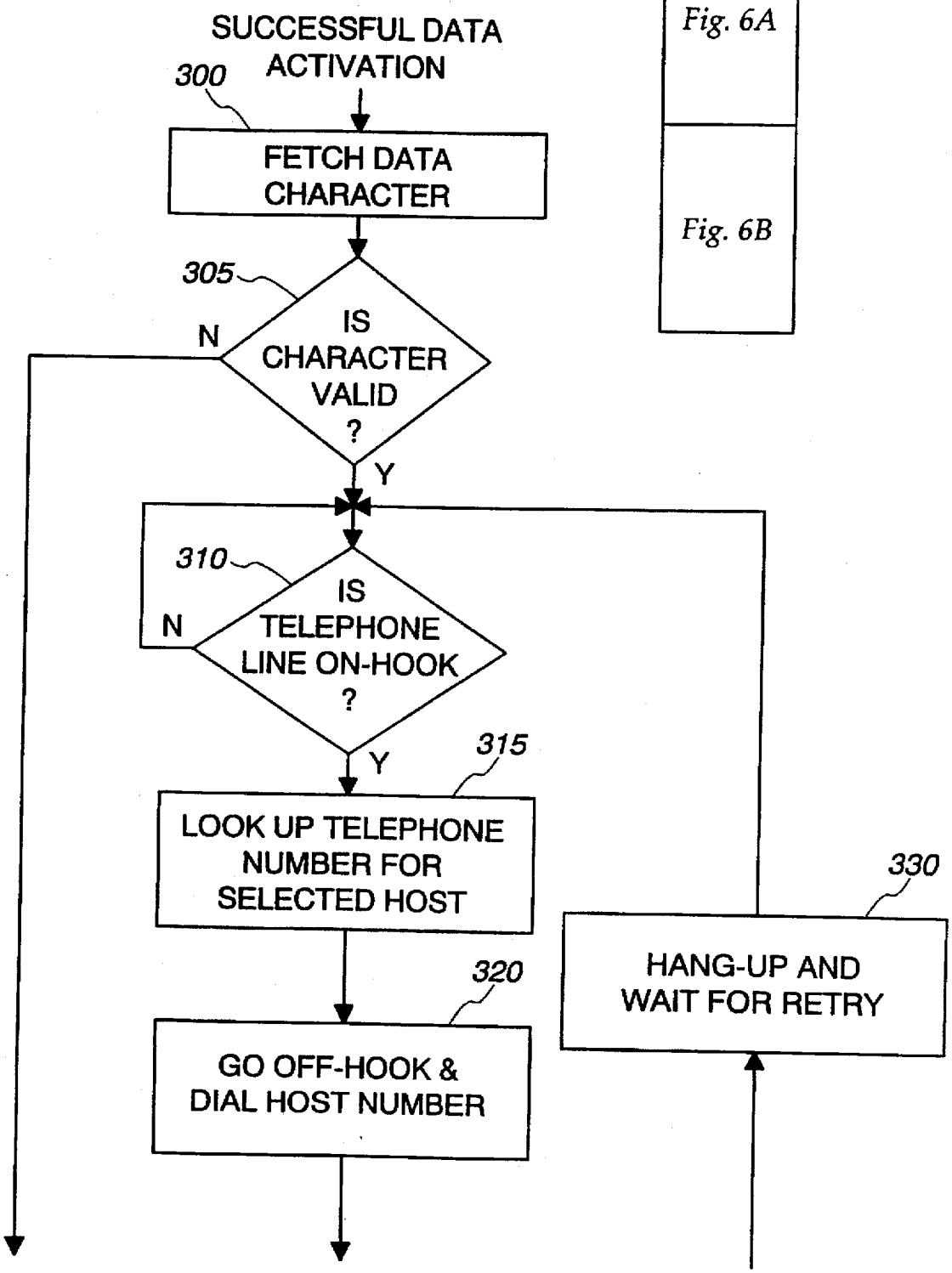
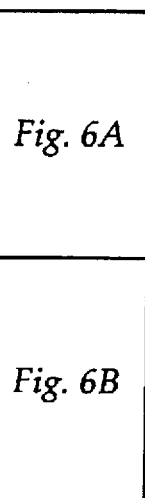

APPARATUS AND METHOD FOR ON-DEMAND ACTIVATION OF TELEPHONE LINE TELEMETRY DEVICES

CROSS REFERENCE TO RELATED PATENT APPLICATIONS

This patent application relates to my copending patent application entitled "APPARATUS AND METHOD FOR OPERATING A TELEPHONE LINE TELEMETRY DEVICE IN A MULTIPLE HOST ENVIRONMENT", Ser. No. 08/519,526 filed concurrently herewith and assigned to the same assignee, the disclosure of which is incorporated herein by reference.

BACKGROUND OF THE INVENTION

This invention relates in general to data collection systems which use remotely located telemetry devices to transfer telemetry data from a remote site to a central processing location. More specifically, the invention relates to automatic meter reading (AMR) systems which use conventional subscriber telephone lines to transfer telemetry data, in the form of utility meter readings, from a customer's premises to a central processing location.

Prior to the existence of automatic meter reading (AMR) systems, the most common method for determining the amount of commodity delivered to a utility customer was to manually read a meter at, or in close proximity to, the customer premises. Because the utility meters were located at the point where the utility commodity was dispensed to the customer, it became necessary for utility companies to establish routes where a human "meter reader" periodically visited each meter on the route to record the amount of utility product consumed.

At present, many utilities, including gas, electric and water companies, continue to send meter readers to consumer residences to collect utility meter readings. However, there are practical limitations as to how often and how efficiently this procedure can be manually performed. For instance, weather and the ability to gain access to meters themselves (which are often inside the consumer's residence) directly impact the efficiency of this manual procedure. Today, where it is desirable for the utility to have almost instantaneous access to any meter, the manual method for collecting these readings is becoming both economically and operationally obsolete in favor of the more reliable automatic techniques now available.

One very practical methodology for automating the process of collecting utility meter readings utilizes the existing telephone system, thereby taking advantage of the already widespread availability of telephone service to both residential and business premises. Using the existing telephone system infrastructure, remotely located telemetry devices (at each consumer's premises) electronically upload utility meter readings as telemetry data to a central processing location via the subscriber telephone lines. Unlike the manual procedure used by many PC users to electronically upload files by the use of a modem connected to the subscriber telephone line, most AMR procedures are fully automatic. This invention relates to those AMR systems which utilize telephone line telemetry techniques.

A typical AMR system configuration is shown in FIG. 1A where a utility company (or meter reading service) utilizes a single host computer system 4 to collect data from a plurality of consumers (homes, apartments, businesses, etc.) over the existing telephone system. In certain applications, the host computer system may be co-resident with a telephone central office switch 6 or it may be remotely located (as shown), appearing as just another subscriber telephone line 8 to the central office switch 6. At each consumption point, a telephone line telemetry device 10 is connected to one or more utility meters (not shown) thereby making the meters electronically accessible to a host computer system via the existing public telephone network.

As shown in more detail in FIG. 1B, the design of telemetry device 10 is such that it operates over the same telephone line 8 as the subscriber's telephone set 12 so there is no need for additional phone lines or infrastructure. In AMR applications, telemetry device 10 is called a meter interface unit (MIU) or telemetry interface unit (TIU), since the device serves as an interface between two different electrical environments. One side of MIU telemetry device 10, called the meter side, is connected to one or more utility meters 14, 16, 18 while the remaining side of the MIU is connected in parallel across the subscriber telephone line 8. With regard to the telephone line side of the MIU, the connection is electrically equivalent to the homeowner plugging in an additional telephone or answering machine and telemetry device 10 appears in parallel with the other telephone devices 20 which are connected to the phone line. As shown in FIG. 1B, other than connecting MIU 10 to the subscriber line, no modification of the existing telephone line wiring is required.

In one particular type of AMR system, known as a dial-inbound system, the telemetry device incorporates a real time clock thereby enabling it to call into a processing center or host computer system at a prearranged date and time. By electronically interrogating the utility meters attached to it, MIU telemetry device 10 uploads information with respect to the amount of metered commodity delivered to the consumer's premises. In return, it receives telemetry data from host computer system 4 which includes its next appointment time and date. At the conclusion of the telemetry exchange, the MIU "hangs up," placing it back into an on-hook quiescent mode (static mode) wherein it waits for the next scheduled appointment. Thus, except at the designated (prearranged) appointment times, the dial-inbound MIU device is not accessible to the host computer system. An MIU telemetry device suitable for use in a dial-inbound system is described in my patent entitled "APPARATUS AND METHOD FOR ACTIVATING AN INBOUND TELEMETRY DEVICE", U.S. Pat. No. 5,235,634, the disclosure of which is incorporated herein by reference.

In another type of AMR system, known as a dial-outbound system, the MIU telemetry device normally resides in a quiescent on-hook (ie. static) mode, continuously vigilant for the reception of an alerting tone signal from the central office switch. Upon reception of this alerting tone, the telemetry device is momentarily switched to an active (ie. dynamic) mode wherein it goes off-hook to establish a data connection with the activating host computer, again returning to its normal quiescent mode at the conclusion of the telemetry session. In a special access arrangement with the telephone company, a connection to the subscriber telephone line is established through the no-ring test trunk of the central office switch. Consequently, an activating tone signal can be directed to any selected MIU without ringing the subscriber line and telemetry data can be unobtrusively exchanged without disturbing the subscriber. An MIU telemetry device suitable for use in a dial-outbound system is described in my patent entitled "OUTBOUND TELEMETRY DEVICE", U.S. Pat. No. 5,204,896, the disclosure of which is incorporated herein by reference.

While dial-outbound telemetry devices can be essentially "on-demand" activated, a recognized weakness of the dial-inbound system is that the telemetry devices are inaccessible except at their prearranged appointment times. In practice, this is an unacceptable limitation since there are many operational scenarios where on-demand activation of a remotely located telemetry device is essential. A case in point, for example, would be the immediate need to make an "on-demand" reading of the utility meter when a consumer terminates service (or initiates new service) so as to settle accounts. Similarly, if the utility company suspected a problem (eg. a water leak) at the consumer premises, immediate access to the meter is desirable, if not essential. Since on-demand activation, with its unpredictable timetable, is diametric to the normal operation of the dial-inbound architecture itself, MIU designers have adopted different methods to overcome this fundamental weakness and add this essential capability to their telemetry devices.

As described in my previously mentioned patent entitled "APPARATUS AND METHOD FOR ACTIVATING AN INBOUND TELEMETRY DEVICE", U.S. Pat. No 5,235,634, one telemetry device can be on-demand activated by ringing the subscriber telephone line for an abnormally large number of times (for example, 10–15 rings). The telemetry device is designed such that it counts the number of rings on all incoming phone calls and will subsequently be activated to make an on-demand reading of the utility meters if the ring-count threshold is exceeded.

Still another method used in the prior art for the on-demand activation of dial-inbound MIU's, employed in the Neptune TDI-1500 (Schlumberger Industries, 3155 Northwoods Parkway, Norcross, Ga. 30071), involves ringing the subscriber telephone line one time. In contrast with the method taught by Oliver, the Neptune device must receive one, and only one, ring to be activated; it is deactivated by the reception of a plurality of rings. As the ring signal heard in the callers telephone handset is not real time, the chances of ringing the telephone one and one time are problematic, as is the chance of successfully activating this conventional device.

Although the multiple ring methodology taught by Oliver is believed to be a more reliable procedure for the on-demand activation of dial-inbound telemetry devices, it is susceptible to being disrupted by a telephone answering machine. In the attempt to ring the subscriber line, the telephone answering machine will intercept the call before the ring-count activation threshold of the telemetry device is exceeded. Thus, it will be impossible to on-demand activate those telemetry devices which have to contend with a telephone answering machine, since the answering machine will always answer.

Since ringing any telephone line is potentially disruptive to the subscriber, another dial-outbound telemetry system, described by Stuart Garland in "Telemetry Access Arrangement", U.S. Pat. No. 5,189,694, utilizes a special access arrangement to avoid ringing the subscriber telephone line. By introducing a new grade of service to the central office switch, a new class of call is permitted which allows a connection to be set up without ringing (or only momentarily ringing with an "abbreviated ring" signal which is not repeated through to the subscriber line). In this conventional approach, once the connection is made the dial-outbound telemetry device is activated by an audible tone signal.

Since both the single-ring and multiple-ring methodologies described can be defeated if the user prematurely answers the telephone, other devices of the prior art, for example the dial-inbound MIU's manufactured by Badger Meter, Inc. (4545 W. Brown Deer Rd., Milwaukee, Wis. 53223-10099) and by Sensus Technologies, Inc. (formally Rockwell Std. Corp., Bailey & Gallatin Ave., Uniontown, Pa.), require the user to answer the ringing telephone. The dial-inbound MIU's of this design incorporate a dedicated tone decoder receptive to a single frequency alerting tone, which will subsequently activate the MIU.

Operationally, to make an on-demand reading, the utility company would ring the subscriber's telephone and wait for the subscriber to answer. After a brief conversation wherein the subscriber was informed to remain silently on the line, the audible alerting tone was transmitted by the utility company. Subsequently, the activating tone signal would appear across the input terminals of all the telephone devices connected to the subscriber's telephone line, including the on-hook MIU. Although the MIU, itself being on-hook, is not active, it is designed to monitor the off-hook connection of another telephone device for the presence of an alerting tone; in essence, the device listens in on an engaged phone line. If an alerting tone of the proper frequency and duration is detected, the dial-inbound MIU is activated. It responds immediately by going off-hook to exchange telemetry data, while the subscriber listens, with the host computer system.

While this methodology can accommodate telephone answering machines by sending the alerting tone signal in the silent period following the answering machine's outgoing announcement, it has other deficiencies. For instance, the technique fails completely unless someone, or some telephone device (eg. an answering machine), answers the ringing telephone. Assuming an answer, when activated the dial-inbound MIU appears as a second off-hook device, in parallel with the first answering telephone device, as it engages in a telemetry transaction. Besides an undesirable reduction in amplitude of the data signal (caused by two parallel off-hook telephone devices), any background noise further degrades the reliability of the data connection, thereby introducing errors in the telemetry data. Finally, the dedicated tone decoder, which is used exclusively for the on-demand activation of the MIU, adds significantly to the cost and complexity of this dial-inbound MIU.

Despite the fact that many MIU telemetry devices can be connected to a plurality of utility meters, telemetry devices of the prior art cannot selectively read utility meters. Since their on-demand activation methodologies rely on singular events, namely the reception of an alerting tone signal or a prescribed number of rings, there is believed to be no known method for conveying data to the telemetry device so as to selectively enable it. Thus when on-demand activated, MIU devices of the prior art have no alternative but to electronically interrogate all the utility meters connected to their meter interface ports and upload the readings as telemetry data. A problem with conventional telemetry devices, therefore, is that the telemetry devices cannot be remotely instructed to selectively read a specific meter, or meters, from a plurality connected to it.

However, a more generic limitation of conventional telemetry devices is that they operate in a single host environment, that is, the telemetry device is inherently designed to communicate with only a single corresponding host computer system. Consequently, a more general problem with the conventional telemetry device is that it cannot be on-demand activated to contact more than one host.

SUMMARY OF THE INVENTION

Accordingly, one object of the present invention is to provide a telemetry device with a capability of being on-demand activated.

Another object of the invention is to provide a telemetry device with a capability of being on-demand activated by a data signal, whereby the telemetry device receives data as part of the activating signal.

Yet another object of the present invention is to provide a telemetry device with a capability of being on-demand activated by a data signal, wherein data received in the activating signal is used by the telemetry device to configure its response to the activating signal.

Yet still another object of invention is to provide a telemetry device with a capability of being on-demand activated by a data signal wherein the complexity of the telemetry device is reduced by using the existing data modem to decode the activating data signal.

A still further object of the present invention is to provide a multiple host dial-inbound MIU device with a capability of being on-demand activated by a data signal, wherein data included in the activating signal instructs the MIU to call a specific host, from a plurality of hosts.

Still another object of the present invention is to provide a dial-outbound MIU device with a capability of being on-demand activated by a data signal, wherein data received in the activating signal instructs the MIU to open one, or more, selected meter interface ports on the MIU.

One other object of the present invention is to provide a telemetry device with a data activation capability which incorporates the functionality of both a dial-inbound and a dial-outbound telemetry into one telemetry device.

In accordance with one embodiment of the present invention, a telemetry device is provided for collecting information at a remote location and transmitting the information over a phone line to a host station. The telemetry device includes at least one meter port. The telemetry device also includes a receiver for receiving a data activating signal transmitted over the phone line to the telemetry device. The data activating signal designates which one of a plurality of different information transactions should be performed by the telemetry device as the designated information transaction. The telemetry device includes an information transaction apparatus, coupled to the receiver, for performing the designated information transaction. The information transaction apparatus decodes the data activating signal to determine which of the plurality of different information transactions is the designated information transaction. The information transaction apparatus is coupled to a meter port and reads information from the meter port. The information transaction apparatus transmits the information over the phone line to a host station to carry out the designated information transaction. In one embodiment, the data activating signal includes data which identifies which one of the plurality of meter ports is to be read. In another embodiment, the data activating signal indicates which one of a plurality of host stations is to receive the information from the telemetry device. In one version, the telemetry device is activated from an on-hook state to an off-hook state in response to reception of the data activating signal. In one embodiment of the telemetry device, the data activating signal is a multi-bit signal.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 1A is a block diagram of a conventional AMR system.

FIG. 1B is a block diagram of conventional telephone device equipment including an MIU telemetry device located at the utility consumer's premises.

FIG. 2A is a block diagram of the disclosed multiple host AMR system.

FIG. 2B is a block diagram of equipment at the consumer's premises inducting the disclosed telemetry device.

FIG. 2C is a block diagram of equipment at the central office premises in the disclosed system.

FIG. 3 is a simplified schematic diagram of the disclosed MIU telemetry device.

FIG. 4A–4B is a flow chart depicting the operational flow of a methodology used by the MIU telemetry device to decode a data activation signal to activate the telemetry device.

FIG. 6A–6B is a flow chart depicting the operational flow for a dial-inbound MIU telemetry device after being successfully activated by the reception of a data activation signal.

DETAILED DESCRIPTION OF THE INVENTION

Figure 4B:
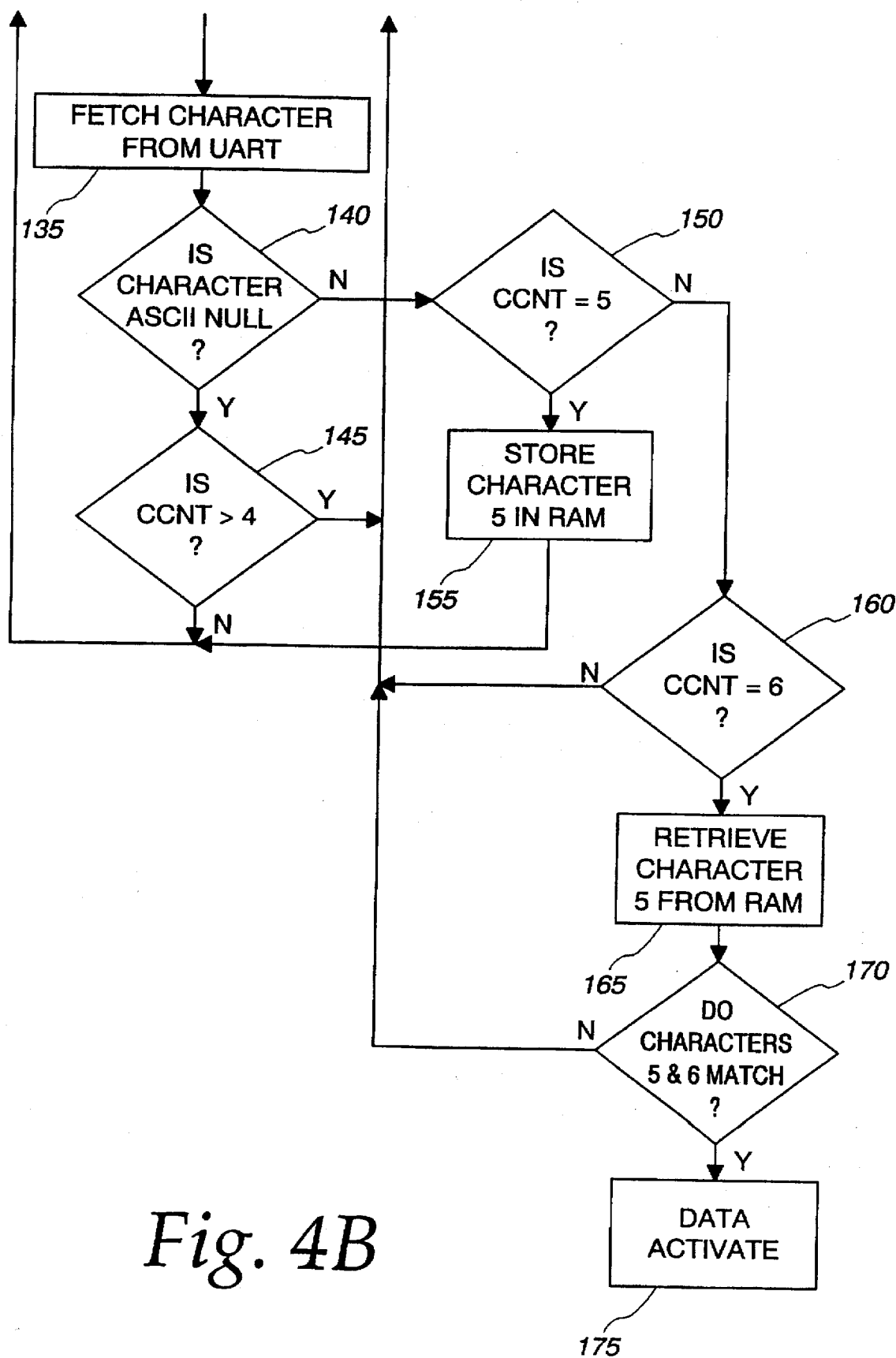

FIG. 2A shows a multiple host dial-inbound AMR system 22. The system is configured such that a plurality of consumer stations 24, 25 and 26 are each connected to the central office switch 28 via conventional subscriber telephone lines 30. As the term "multiple host" suggests, also connected to central office switch 28 via conventional dial-up telephone lines are one or more hosts such as host 1, host 2 and host 3. In keeping with the operation of a dial-inbound system, telemetry devices (not shown) located at the consumer stations will dial into a host at an appointed time and date to exchange telemetry data. A more complete description of a multiple host dial-inbound system is described and claimed in my co-pending patent application "APPARATUS AND METHOD FOR OPERATING A TELEPHONE LINE TELEMETRY DEVICE IN A MULTIPLE HOST ENVIRONMENT" (Docket No. P95-K-006, filed concurrently herewith) the disclosure of which is incorporated herein by reference. Specifically, the "multiple host" terminology refers to the capability of a single MIU telemetry device to exchange telemetry data with more than one host.

As shown in FIG. 2B, at each consumer station (of which station 24 is illustrative) a telemetry device 34 is connected to the subscriber telephone line 30. The design of telemetry device 34 is such that it can share the telephone line with other telephone devices which the subscriber might connect to the line, such as a conventional telephone set 35, an answering machine 36, a FAX (facsimile) machine, a computer modem, and so forth. If desired, however, the telephone line at the consumer's premises may be dedicated to serving only the telemetry device 34 at those premises. Connected to the MIU telemetry device 34 are one or more utility meters such as meters 37, 38,39 and 40 which can be electrically interrogated to ascertain the value of consumed commodity shown on the face of the meter (called the meter register). A significant feature of telemetry device 34 is its ability to be on-demand activated by the reception of an activating data signal while it is in an on-hook condition For purposes of this document, a "data activating signal" is defined to be a signal capable of carrying sufficient information to uniquely identify each port of multiple ports from which the telemetry device is to read information or to uniquely identify each host station of a plurality of host stations to which information the telemetry device is to transmit information. In other words, the data activating signal includes a sufficient number of states or values such that a respective state or value is uniquely associated with each respective meter port, or alternatively, with each respective host. In one embodiment, the data activating signal is a multi-bit signal to enable multiple objects, for example particular meter ports or particular hosts, to be selected. This data activating signal is to be distinguished from a single alert tone which by definition is typically merely capable of signalling a single device to turn on. In one embodiment, the data activating signal is digital data carried on an analog carrier such as a frequency shift keying (FSK) signal transmission.

Unlike the conventional tone activation methodologies, the data signal contains information data which is used by MIU telemetry device 34 to configure its response to the data activating signal.

The configuration of consumer station 24 depicted in FIG. 2B is representative of possible MIU telemetry device installations. Station configurations similar to that of consumer station 24 can also be employed as consumer stations 25 and 26.

Topographically, the dial-inbound AMR system configuration shown in FIG. 2A can also support a dial-outbound AMR system. As shown in FIG. 2C, unrelated to the dial-inbound system, a dial-outbound host controller 43 is located at the central office switch 28 at the central office premises 41. By utilizing the no-ring test trunk 42 on central office switch 28, the dial-outbound host controller 43 can connect to a subscriber line without ringing it. Once access to the subscriber line is made, the dial-outbound host controller then sends an activating data signal to the dial-outbound telemetry device. Information contained within the activating data signal informs the dial-outbound MIU which utility meter, or meters, to read. Using this information, the dial-outbound MIU telemetry device will immediately seize the telephone line, by going off-hook, to engage in a telemetry transaction with the on-line host controller 43.

Thus, in view of the above discussion, the telemetry device or MIU shown in FIG. 2B can be implemented as either a dial-inbound or a dial-outbound device, as desired for the particular AMR application. Although both types of telemetry device are activated while they are in an on-hook mode, there are slight differences in the activation methodology. In the case of a dial-outbound telemetry device, host controller 43 operates in conjunction with central office switch 28 thereby enabling host controller 43 to activate the telemetry device anytime the subscriber telephone line is not being used; as discussed above, the telemetry device responds immediately to the activating signal by going off-hook to engage in a telemetry transaction.

In contrast, the dial-inbound system implementation does not have this special access (to the test trunk) arrangement with the telephone company and therefore the host must dial through central office switch 28 and ring the subscriber telephone line. Since the telemetry device cannot be allowed to answer the ringing telephone line (as answering could result in a toll call charge to the calling party), the activating data signal is sent after the user or other user-installed telephone device answers the ringing telephone line. It is important to note that the telemetry device remains in an on-hook mode, even though another telephone device is off-hook. That is, a first on-hook device (namely, the MIU telemetry device) is monitoring the telephone line coupled in parallel with a second off-hook device for the presence of an activating data signal. In this case, the data signal provides information to MIU telemetry device 34 thereby informing it as to which one of hosts 1-3 wishes to make an on-demand reading of a utility meter. Following the reception of the activating data signal, the dial-inbound MIU telemetry device, as the name implies, will wait until the telephone line is available and then call back into the particular host indicated by the data signal (ie. it will dial inbound) to engage in a telemetry transaction with that particular host.

FIG. 3 shows a simplified schematic of a preferred MIU telemetry device 34. The MIU shown can be employed as a dial-inbound or a dial-outbound telemetry device, as the particular application requires. In actual practice, the structures of the dial-inbound and dial-outbound versions of the telemetry device are very similar. However, the fundamental difference between the two versions of the telemetry device is that the dial-outbound device does not require real time clock U3, since it is always on-demand activated by equipment located at the central office switch.

Referring to FIG. 3, MIU telemetry device 34 includes a microcontroller U1 connected to one or more meter interface ports M1–M4. Meter interface ports M1–M4 are connected to electrically encoded registers on the utility meters 37–40, respectively, (see FIG. 2B) and can be interrogated by microcontroller U1 using a predetermined serial protocol. In this manner, microcontroller U1 can read the value shown on the face of each utility meter. This value will be uploaded to the host computer system, such as one of hosts 1-3, as telemetry data. The electrically encoded meter register could be, for example, a Kent model C700 water meter with encoded register or a Landis & Gyr model DEMS electric meter. A variety of other electrically readable utility meters are also commercially available and can be interfaced to microcontroller U1 by those skilled in the art.

Microcontroller U1 actually includes a microprocessor core and digital memory in the form of a RAM 45 (random access memory) and ROM 47 (read only memory). MIU telemetry device 34 operates under the program control of microcontroller U1. ROM 47 contains firmware which controls the entire operation of MIU telemetry device 34. Flow charts which set forth the process flow which is implemented and controlled by this firmware will be presented and discussed later. While ROM memory 45 can be read but not altered, RAM memory 47 can be changed under program control and is used to store program variables, or other temporary data which the program might need for later use. In practice, microcontroller U1 is usually a single chip semiconductor device such as the Motorola M68HC05 which contains on-board ROM and RAM.

Certain variables such as the host telephone number and appointment time, for a dial-inbound MIU, or telemetry device configuration data for both dial-inbound and dial-outbound MIU's need to be initially programmed into the MIU and must be permanently retained, even if power to the MIU is momentarily interrupted. Thus, also connected to microcontroller U1 is a EEROM (electrically erasable ROM) U2 which serves as a nonvolatile memory for the MIU. One EEROM which can be employed as EEROM U2 is the XL93C46 EEROM manufactured by Exel. Alternately, certain microcontrollers such as the Motorola HC11 series of microcontrollers also contain on-chip EEROM memory which could provide the same functionality as the discrete nonvolatile memory U2, if desired.

Microcontroller U1 also includes a programming port 70. As just discussed, the configuring of a particular MIU 34 for operation in a target AMR system is accomplished by programming the initial values of certain software variables, including the dial-inbound attributes for each of the hosts, into non-volatile memory U2. The dial-inbound attributes include an appointment time and telephone number for each host. Although the MIU is often remotely programmed over the telephone line by a host, it is still necessary to provide it with a telephone number and other initial values (for example, an MIU serial number, which uniquely identifies the MIU device to the host) so that it can call into the programming host. An installer manually connects either a PC (personal computer) or a standard RS-232-C terminal to the programming port 70 to initially configure the telemetry device. Otherwise, in normal operation, these terminals are left unconnected (ie. open circuit).

If telemetry device 34 shown in FIG. 3 is implemented as a dial-inbound device, then a real time clock U3 is also connected to microcontroller U1. This clock U3 can be programmed with an alarm time and date so as to activate the dial-inbound MIU to call a host at a designated time. Microcontroller U1 can configure real time clock U3 under program control and can set both the current time and the alarm time. In addition, the microcontroller can also interrogate real time clock U3 to ascertain the current time. A single chip real time clock which is well suited to this task and which can be readily interfaced to microcontroller U1 by those skilled in the art is the Ricoh RP5C15 real time clock.

To monitor the status of the subscriber telephone line, a telephone line status indicator 50 is also connected to the microcontroller U1. Through this complex device, microcontroller U1 is kept informed of the current status of the phone line. The components contained in status line indicator 50 are a static off-hook detector 52, a dynamic off-hook detector 54, and an incoming ring detector 56.

Static off-hook detector 52 prevents telemetry device 34 from attempting to seize telephone line 30 if phone line 30 is already in use, thereby preventing it from possibly interfering with an in-progress telephone call. More particularly, static off-hook detector 52 provides a static off-hook detector signal at output 52A which instructs microcontroller U1 not to seize the phone line (go off-hook) when phone line 30 is already in use. One static off-hook detector which is suitable for use as static off-hook detector 52 is described in my patent "SIGNAL PROCESSING CIRCUIT FOR USE IN TELEMETRY DEVICES", U.S. Pat. No. 5,202,916, the disclosure of which is incorporated herein by reference.

Assuming that telemetry device 34 is already off-hook, then dynamic off-hook detector 54 is used to immediately hang-up telemetry device 34 in the event that a user telephone, or other telephone device, coincidentally comes off-hook thereby interrupting an on-going telemetry session. More particularly, dynamic off-hook detector 54 provides a dynamic off-hook detector signal at output 54A which informs microcontroller U1 when a user telephone or other telephone devices comes off-hook while the telemetry device is carrying on a telemetry exchange with the host. When this occurs, microcontroller U1 causes telemetry device 34 to immediately hang-up and relinquish the phone line. Dynamic off-hook detectors which are suitable for use as dynamic off-hook detector 54 are described in my patent "OUTBOUND TELEMETRY DEVICE", U.S. Pat. No. 5,204,896 and in my patent applications "TELEMETRY DEVICE INCLUDING A DYNAMIC OFF-HOOK DETECTOR" (Ser. No. 08/128,865) and "TELEMETRY DEVICE INCLUDING A DYNAMIC OFF-HOOK DETECTOR CAPABLE OF OPERATING IN A PULSE-DIALING ENVIRONMENT" (Ser. No. 08/128,864), the disclosure of each of which are incorporated herein by reference.

Finally, if the telemetry device 34 is implemented as the dial-inbound version, telephone line status indicator 50 also includes a ring detector 56 which enables microcontroller U1 to count the number of rings subscriber line 30 receives. Ring detector 56 provides a ring detector signal at output 56A to inform microcontroller U1 as to the reception of each ring at telephone line input terminals 30A and 30B. When a predetermined threshold number of rings is counted by microcontroller U1, representing the reception of a specified number of rings without an answer, this condition will be duly noted by the microcontroller. As previously mentioned, the reception of an abnormally large number of rings is one alternative method (a non-data method) for activating a dial-inbound telemetry device in the event that the subscriber, or other telephone device, does not answer the ringing phone line. More particularly, an activation methodology suitable for activating the telemetry device after the reception of multiple rings is described in my patent "APPARATUS AND METHOD FOR ACTIVATING AN INBOUND TELEMETRY DEVICE", U.S. Pat. No. 5,235,634.

Also connected to microcontroller U1 is a modem 60 which is connected to phone line 30 via hybrid transformer T1. When relay K1 is closed, telemetry device 34 can seize the telephone line and draw loop current (approximately 50 mA) from the central office switch. With relay K1 energized, hybrid transformer appears as a 600 ohm load required to properly terminate the off-hook telephone line. While the telemetry device is pulling loop current, the central office switch knows that a telephone device is off-hook and will initially provide dial tone to the off-hook telephone device. To facilitate the dialing of a telephone number, the design of modem 50 includes a DTMF (dual tone multifrequency) dialer which is under the program control of microcontroller U1, thereby enabling telemetry device 34 to call into a host system. A variety of commercial manufacturers sell modems which can be used as modem 60. For instance, the entire modem could be a single chip integrated circuit such as the SC11016 "300/1200 bit per second modem" manufactured by Sierra Semiconductor, if desired.

Microcontroller U1 configures the operation of modem 60 by sending instructions to set the baud rate and other communication parameters via CNTL control lines 62 thereby preparing it for a telemetry transaction. Once connected to a remote host, data sent from the host to the MIU appears on the receive data (RXD) output of modem 60 while data to be sent from MIU telemetry device 34 to one of the hosts is placed on the transmit data (TXD) input of the modem 60. Since both transmit and receive data are accessible to microcontroller U1, the telemetry device is capable of sending data to and receiving data from a host. Thus, modem 60 is a hardware peripheral to the microcontroller which interfaces the telemetry device to and facilitates the transport of telemetry data over the telephone line.

In a departure from the design of conventional telemetry devices, an operational amplifier 64 is configured as a high input impedance amplifier network 66 so as monitor the input terminals 30A an 30B of telephone line 30 while telemetry device 34 is in an on-hook condition. In this on-hook state, the input impedance of amplifier network 66 must be significantly greater than approximately 10M (10 million) ohms, to avoid adversely loading the open circuit terminals of the phone line. Since the telephone company regularly checks the condition of the subscriber telephone line by measuring its on-hook impedance from the central office switch as part of their maintenance procedures, it is essential that amplifier network 66 present a sufficiently high input impedance to avoid interfering with this testing.

The amplifier network 66 also serves to convert the balanced input of the telephone line 30 to an unbalanced, single ended output. The values of resistors R1 and R2 are equal, as are the values of resistors R3 and R4. The series resistance of resistors R1 and R3 (and therefore R2 and R4) is in excess of 10M (10 million) ohms to maintain a high input impedance so that amplifier network 66 does not improperly load the on-hook (ie. open circuit) telephone line. Resistors R5 and R6 are also of equal value and serve to establish a bias voltage for operational amplifier 64 at half of the supply voltage $V_s$. The parallel combination of resistors R5 and R6 is made equal to the value of R7 to balance to offset voltage of the operational amplifier A1. A typical value for R5 (or R6) is about 4M ohms, resulting in a value for R7 of about 2M ohms. The given values for resistors R1 to R7 result in an amplifier network 66 which has a DC input impedance greater than 20M ohms to the balanced telephone line. Capacitors C1 and C2 are equal valued and allow the AC gain of the amplifier to be greater than the DC gain, thereby selectively amplifying the voice-band (300–3000 Hz) signals on the telephone line.

The unbalanced output from the amplifier network 66 is passed though an AC coupling capacitor C3 to the drain of a FET (field effect transistor) Q1 which can be turned on and off by microcontroller U1, which controls the voltage on the gate of FET Q1. When MIU telemetry device 34 is in an on-hook condition, relay K1 is open and FET Q1 is enabled (turned on), thereby coupling a signal from the telephone line to the demodulator in the modem 60 without significantly loading the on-hook impedance of the telephone line. Consequently, modem 60 can receive data signals while the MIU is in an on-hook mode. However, when telemetry device 34 seizes the phone line, by energizing relay K1, FET Q1 is turned off by microcontroller U1 since the modem is then connected directly to the telephone line via transformer T1.

In this novel configuration, the functionality of the modem (a contraction of the words modulator-demodulator) is shared. In a first mode, the modem functions to transfer telemetry data over a telephone line while in a second mode it is also used as a demodulator to couple a data activation signal to a data decoder. Because the same modem is used for data activation and telemetry purposes, this design is very economical and requires only a minimal number of additional components to implement. Alternatively, it is also possible to design a telemetry device with an entirely separate modem (or an entirely separate data decoder, if desired) which is dedicated to the data activation function. Indeed, in certain applications, such as those requiring extremely low power consumption, a specialized design of this type may be desirable.

It is interesting to note that if the modem 60 is capable of operating in a plurality of modes, it is entirely possible for telemetry device 34 to be made receptive to a data activating signal in a first mode while the subsequent telemetry transaction is conducted in a second mode. That is, there is not an absolute requirement for the data activating signal to use the same communication format or protocol as that which the data activating signal employs. For instance, if modem 60 were to be the SC11016 "300/1200 bit per second modem" manufactured by Sierra Semiconductor, then MIU 34 depicted in FIG. 3 could be activated by a data activating signal sent from a host to MIU 34 at 300 baud while the telemetry exchange with the host is conducted at a 1200 baud rate. To facilitate this type of dual-mode operation, microcontroller U1, under program control, reconfigures the operating mode of modem 60 at the appropriate mode transition points.

For MIU telemetry device 34 shown in FIG. 3, the on-hook mode of operation is when relay K1 is open and FET Q1 is enabled. In this mode, any signal appearing at the input terminals 30A–30B of the MIU will be coupled to modem 60. If a data signal is present to which modem 60 is responsive, the demodulated data will appear at the RXD (receive data) port of the modem 60, which is coupled to the microcontroller U1. In this particular embodiment, the only time that the MIU telemetry device will not be in an on-hook mode is when it has seized the telephone line to engage in a telemetry transaction. Since all the MIU components in FIG. 3 are continuously powered, the telemetry device is continuously monitoring the phone line to the MIU for the reception of a data signal except at those times when it is off-hook, already engaged in a telemetry transaction.

It is specifically noted that the on-hook mode of operation for the MIU does not imply that telephone line is either on-hook or off-hook, only that the MIU is on-hook. For example, if the subscriber is using the user telephone set, the phone line will be in use (off-hook) but the MIU will be in an on-hook mode, monitoring for the presence of a data signal. Consequently, in the on-hook mode the MIU is capable of monitoring either another off-hook telephone device or an on-hook telephone line for the presence of a data signal. Unlike conventional devices, which utilize tone signaling, the modem in this design is capable of receiving data while the telemetry device is on-hook.

Additionally, since the on-hook MIU is always receptive to a data signal, it is conceptually possible for it to even receive data between the ringing signals which activate the telephone's ringer. Since many telephone companies now offer "Caller ID" which identifies the calling party to the called party by sending identification data between the first and second ring cycles, the on-hook MIU 34 can be made receptive to this data as well, if desired. (A ring cycle is the pattern used to ring the telephone set, generally 2 seconds of ringing followed by a 4 second inter-ring pause.) A distinct advantage of this methodology is that it is totally "on-hook technology" and, in the case of a dial-inbound telemetry device, enables the device to receive a data activation signal without the telephone line being taken off-hook.

Since computers work with binary words of information while modem communications are inherently serial, an asynchronous communications protocol is used by modem 60 to send binary words in a serial format. In this format, an 8 bit digital word (ie. a byte) is first serialized and then preceded by a start bit and followed by a stop bit before being transmitted. These extra bits act as place holders and allow the modem to serially transfer 8 bits of data at a time (ie. one binary word) with an arbitrary pause between transfers of binary words, since the computer only communicates in multiples of whole binary words. A device which automatically handles this protocol is called a UART (universal asynchronous receiver-transmitter) and is commercially available from a variety of semiconductor manufacturers. Such a UART could be used to take the serial output of a modem, such as modem 60, and present an 8 bit word (a byte) to a peripheral device, such as a microcontroller. (For an excellent treatise on asynchronous communication the reader is referred to "*Technical Aspects of Data Communication*", by John E. McNamara, Digital Press, 1977, LCCC number 77-93590.)

Because asynchronous communication is very common, some microcontrollers, such as the Motorola M68HC05, incorporate into their design an SCI (serial communications interface) which is programmable UART. As shown in FIG. 3, such an SCI 63 in microcontroller U1 is connected directly to the output of the modem 60 and is capable of generating an internal interrupt to the microcontroller each time a binary word is received. The microcontroller can then check the contents of its UART register to determine the character received.

Recalling that modem 60 is continuously receptive to data while MIU 34 is in an on-hook mode, noise or voice activity or even other computer data signals on the telephone line may be sporadically decoded as data by modem 60. Thus, it is quite expected that the modem will be periodically falsed by audio activity on the phone line for short periods of time. To prevent this undesired situation, MIU 34 features a data activation protocol which is immune to this type of problematic falsing.

For example, in one embodiment, a host computer or activator employs a data activation protocol in which the host repeatedly sends a binary character (ie. one byte) to the data activatable telemetry device. To assure that the data received is not the result of a decoder false, the telemetry device must sequentially receive the same character a predetermined number of times such as 5 times, for example. It should be appreciated that the value 5 is illustrative and that the telemetry device can be required to received the same character for greater or lesser number of times than 5. It is only important that the number of times of character reception be selected to be sufficiently large to prevent falsing problems. The value of the character sent from a particular host to a particular MIU telemetry device contains the specific data activation instructions (eg. which host to call). This is an effective protocol since it is highly unlikely that a decoder will be sequentially falsed so as to decode the same data repeatedly over a specified interval of time. Whereas modem 60 acts to recover the modulated binary data signal which forms the data activating signal, microcontroller U1 acts to actually decode the data activating signal to yield data activating instruction (eg. which host to call in this embodiment, or which meter port to read in another embodiment)

One suitable data activation protocol which is not easily falsed is now described. To activate a particular data activatable telemetry device 34, the activator or host sends a string of four ASCII null characters (ASCII value 00) over the phone line followed by an ASCII character, sent twice, which contains a data value used to selectively activate the telemetry device. This activation sequence is sent at a 300 baud rate. Thus, for example, to data activate an MIU telemetry device 34 so as to cause the telemetry device to call host 32 (also referred to as host 2) the activator (namely host 2) would send 2. The entire six character sequence would be repeated numerous times to increase its chances of reception by the target telemetry device. Of course, other different activating data sequences may be employed as well, if desired to selectively activate the telemetry device. It is thus seen that a particular telemetry device 34 is responsive to particular data signals and not other data signals.

In the preferred embodiment of the MIU telemetry device, the decoding of this activating data sequence is performed by a computer program (ie. in software/firmware) executed by microcontroller U1. A flow chart showing a decoding methodology which can be used to program and control microcontroller U1 is shown in FIG. 4.

Referring now to FIG. 4A, process flow begins at decision block 100 wherein it is determined if MIU 34 is in an on-hook mode or an off-hook mode. In the event that the MIU is off-hook, execution of the computer program is halted or delayed until such time that the MIU has returned to an on-hook mode. When the MIU is found to be in the on-hook mode, control is passed to functional block 105, clearing logical flag RD (receive data) which indicates when a character has been received by the microcontroller's on-chip UART, namely the SCI. For a microcontroller such as the Motorola M68HC05, this would be the RDRF (Receive Data Register Full) flag which would be logically set each time a character is received from modem 60, shown in FIG. 3. Under program control, the microcontroller can clear (reset) this flag and then periodically check it to determine if a character has been received by the on-chip UART, which automatically sets the flag each time a character is received.

After resetting the RD flag, control is then passed to functional block 110 which initializes a numeric RAM variable CCNT (a contraction formed of the words character count) to zero. The value of this variable will change as the program executes and indicates the number of incoming characters received by the M/U at strategic points in the program. Control is then passed to functional block 115 which inserts a 4 mS pause in the program's execution. In practice, during this pause interval of time, the MIU is involved in other operations unrelated to the detection of a data activation sequence. Since an 8 bit character (ie. a byte) sent at 300 bits per second requires about 33 mS to be received, including start and stop bits, a 4 mS service routine to detect the reception of a character will not result in any characters being missed.

After the 4 mS delay, control is passed to decision block 120 which checks to determine if a character has been received by the MIU's modem. In practice, microcontroller U1 checks the RD flag status to make this determination, since the on-chip UART automatically sets the RD flag when a character is received. If the RD flag remains reset, then control is passed back to functional block 115 which again inserts a 4 mS delay before returning control to derision block 120. Thus, in the absence of any characters being received by the MIU, program control is continuously passed back to functional block 115, causing the MIU to wait in 4 mS intervals until a character is received by the UART. Upon reception of an inbound character, derision block 120 will transfer control to functional block 125 which increments the value of CCNT from zero to one (in this case indicating that a first character has been received). Control is subsequently passed to functional block 130 which resets the RD flag before passing control to functional block 135 shown in FIG. 4B which retrieves the received character from the UART for subsequent use.

Control then passes to decision block 140 where the value of the received character is checked to determine if its value is equal to the ASCII null character (binary value 00). Assuming the reception of a first ASCII null character, control would then pass to decision block 145 which would determine if the value of CCNT exceeded a value of four. Since only one character has been received (CCNT=1) control is transferred back to functional block 115. As previously described, control will not be transferred away from functional block 115 until decision block 120 determines that the MIU has received another character.

Assuming the reception of a second ASCII null character, the process just described will repeat identically and program control will move from decision block 120 through functional blocks 125, 130, 135 and then through decision blocks 140 and 145 before eventually returning to decision block 120, after a 4 mS wait inserted by function block 115. The value of the variable CCNT is now 2, indicating the reception of two characters.

However, assuming the reception of two more ASCII null characters, the process loop described above, involving flow chart blocks 115, 120, 125, 130, 135, 140, 145 will repeat with the only difference being that the value of the variable CCNT will be incremented by one each time an ASCII null character is received. Thus, after the reception of four ASCII null characters, the value of CCNT will now be four.

Assuming the reception of yet a fifth ASCII null character, the loop described will be executed again with the exception that value of CCNT will now be 5 and derision block 145, determining that the value of CCNT now exceeds four, will transfer control back to functional block 110 thereby resetting the value of CCNT to zero. Recalling that the activation data sequence is the reception of four ASCII null characters followed by the reception of two identical data characters, the reception of a fifth ASCII null character violates the activation protocol and results in the program returning to its initial conditions with the value of CCNT set to zero and the RD flag reset.

Assuming reception of four sequential ASCII null characters, as previously described, the value of CCNT will be four. If the next character received is anything other than an ASCII null character, derision block 140 will transfer control to derision block 150 which will check to determine if the value of CCNT is equal to five, representing the reception of a fifth character. Since this condition is true, program control is transferred to functional block 155 which will store the value of the fifth received character in RAM memory. Control is then transferred back to functional block 115, as before, for the reception of the next (the sixth) character.

If the next character received is anything other than an ASCII null character, program control will be passed from decision block 140 to decision block 150 and then to decision block 160. Since this is the reception of the sixth character, the value of CCNT will be six and derision block 160 will transfer control to functional block 165 which will fetch the value of the fifth received character previously stored in RAM memory. Control is then transferred to decision block 170 which will compare the value of received characters five and six to determine if they match. If both values agree then a valid data activation sequence has been received and control is passed to the data activation block 175. However, if the values of these characters do not match, then the activation protocol has been violated and decision block 170 will transfer program control back to functional block 110, resulting in the program returning to its initial conditions with the value of CCNT set to zero and the RD flag reset.

Assuming the reception of a valid sequence of activating characters, functional block 175 will begin an activation procedure for the telemetry device. As discussed earlier, if the MIU is of the dial-outbound variety it will immediately seize the phone line to engage in a telemetry transaction. If, on the device, it will is a dial-inbound device, it will wait until the subscriber line is on-hook (the telephone line status indicator U4 in FIG. 3 provides this indication) before it calls into the host.

As described above, the data activation methodology enables the activator or host to deliver information data to the telemetry device. In this case, the data transferred from the activator to the telemetry device is contained in received characters five or six (identical in the activation protocol) of the activation sequence and is used, in a deterministic manner, by the device to configure the response it will make to the activating signal.

Figure 5:
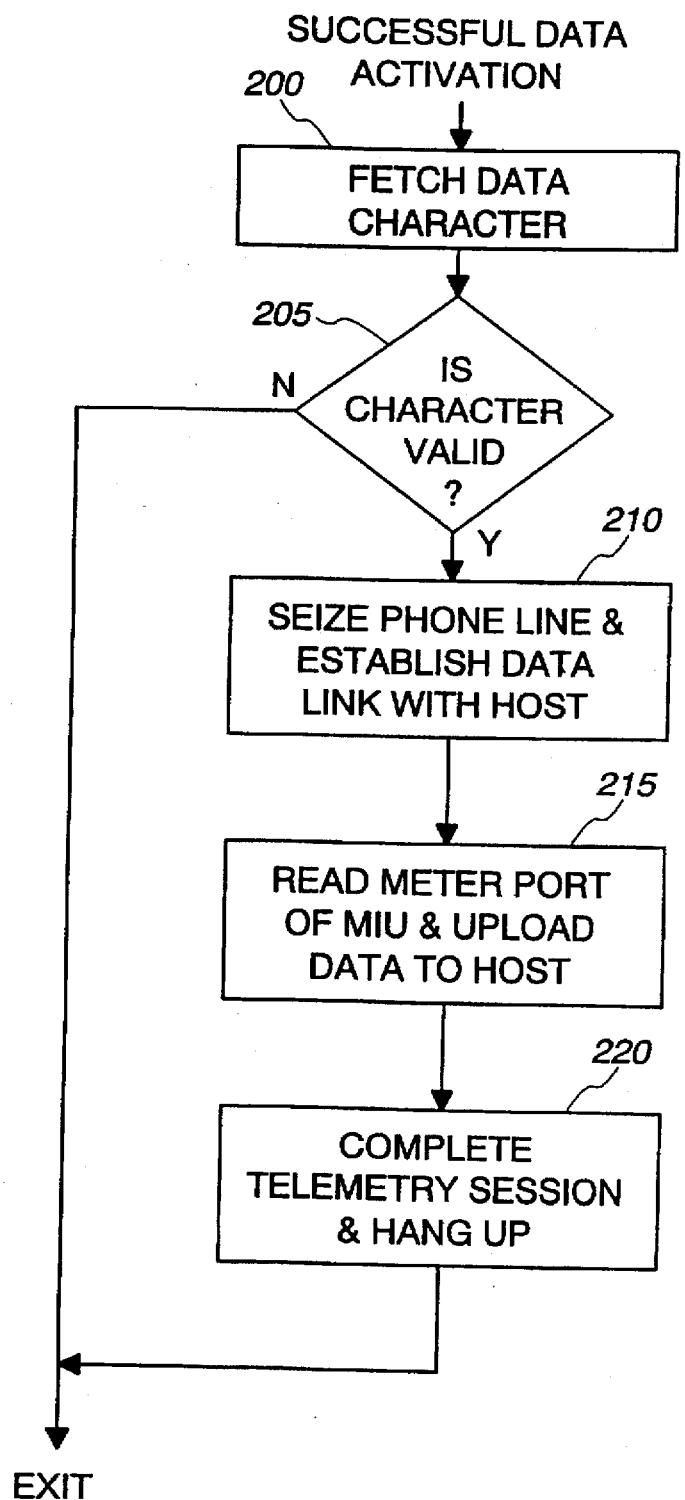
FIG. 5 is a flow chart depicting the operational flow for a dial-outbound MIU telemetry device after being successfully activated by the reception of a data activation signal.

As mentioned in the earlier discussion, FIG. 5 shows a flow chart depicting an activation methodology applicable to a dial-outbound MIU implementation of telemetry device 34. More specifically, FIG. 5 represents the contents functional block 175 shown in FIG. 4 for a dial-outbound MIU. When a valid data activation signal has been received by the dial-outbound version of telemetry device 34, control is transferred from data activate block 175 to decision block 200 which looks at the value of the data character received in the activation protocol, identical characters five and six, as previously described. The value of this character instructs the outbound MIU 34 to open a specific meter port on the MIU for subsequent interrogation. For example, if a "1" character is received, then the MIU opens meter port M1 and takes a reading. If a "2" is received, then the MIU opens meter port M2 and takes a reading, and so forth. (Alternatively, in a dial-inbound embodiment which is discussed later in more detail, the data character could correspond to the particular host system which requires an on-demand reading of their utility meter. In that embodiment, if a "1" character is received, then the MIU seizes the phone line and calls host 1. If a "2" is received, then the MIU seizes the phone line and calls host 2, and so forth. ) Returning now to the dial-outbound embodiment process flow of FIG. 5, control is passed to decision block 205 which determines if the character received represents a valid command, meter port or host. If the character is invalid, the MIU does nothing and returns to the procedure depicted in the flow chart shown in FIG. 4.

In more detail, assuming the data character is valid, control is passed to functional block 210 which causes the dial-outbound MIU to immediately seize the phone line to engage in a telemetry transaction with the waiting host which data activated it. Control then passes to functional block 215 wherein the host interrogates the meter port (ie. meter port 1, if the data character is a "1", or meter port 2, if the data character is a "2"), to read the utility meter attached to such meter port, and uploads that reading as telemetry data to the on-line host. The received data character thus corresponds to a particular one of the meter ports. The particular meter port corresponding to the received data character is the port which is read by the host to obtain consumption information therefrom. Finally, control then passes to functional block 220 wherein the MIU completes its telemetry procedures and disconnects itself from the subscriber telephone line, returning to an on-hook condition. The MIU then returns to the procedure depicted in the flow chart shown in FIG. 4A.

Figure 6B:
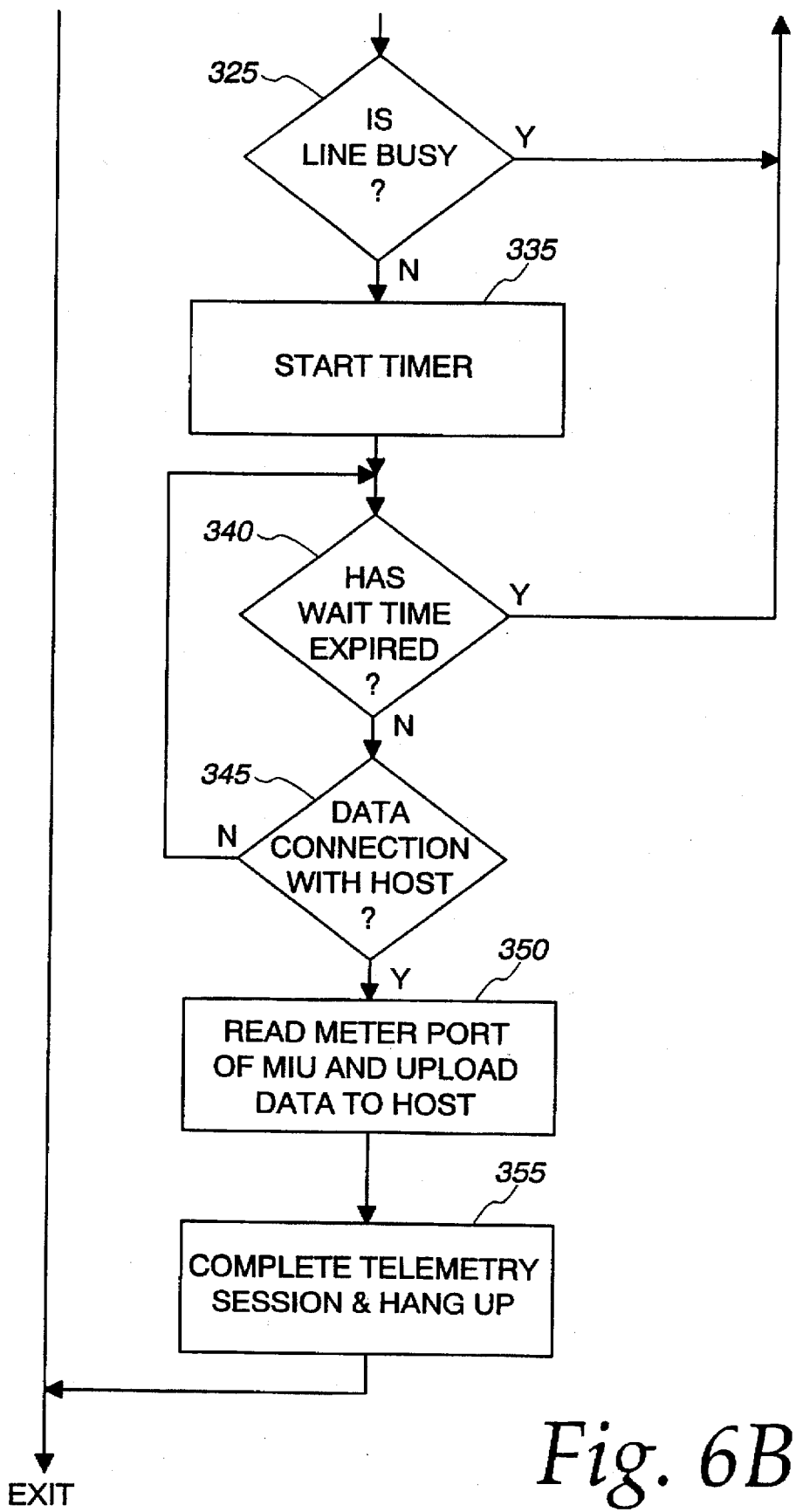

A dial in-bound implementation of MIU 34 is now discussed with reference to the flow chart of FIG. 6A–6B. The methodology employed in such a dial in-bound MIU 34 is substantially the same as presented in the discussion of the flowchart of FIG. 4A and 4B up to functional block 175 wherein MIU is successfully data activated by a valid received data character.

For a multiple host dial-inbound MIU implementation, associated with each host (ie. host 1, host 2 and host 3) are dial-in attributes, namely a respective telephone number and a respective appointment time (stored in non-volatile EEROM memory U2 of FIG. 3). When the dial-inbound MIU is selectively on-demand activated by a data activation, for example by receiving a data activating character "2"

from host 2, the MIU will look up the telephone number for that host and then call the host to engage in a telemetry transaction. The reception of a data activating character, as part of the data activating signal, thus causes the MIU telemetry device to call one host from a possible plurality of hosts and to conduct a telemetry transaction with that particular host.

The implementation of this multiple host dial-inbound methodology is now discussed in more detail with reference to the flow chart of FIG. 6A-6B. Assuming that a particular dial-inbound telemetry device has been successfully data activated as in block 175 of the flow chart of FIG. 4B (by reception of a valid data activating character, for example), then an activation procedure depicted in FIG. 6A-6B is executed. More specifically, when a valid data activation signal has been received by the MIU as per block 175, control is transferred to functional block 300 which looks at the value of the data character received in the activation protocol, namely identical characters five and six, as described earlier. The value of this character corresponds to the host system which requires an on-demand reading of their utility meter. For example, if the data character is a "3", then host 3 is the host requesting an on-demand utility consumption reading. Next, control is passed to decision block 305 which determines if the character received represents a valid command or host. If the character is invalid the MIU does nothing and returns to the procedure depicted in the flow chart shown in FIG. 4.

Assuming the activation data character valid, control is passed to decision block 310 wherein the dial-inbound MIU waits for the telephone line to return to an on-hook condition, since the activator (host 3, in this example) has rung the telephone line causing the MIU, via telephone line status indicator U4 in FIG. 3, to mark the line as busy. When the activator host has hung-up and the telephone line is free, ie. on-hook, control is passed to functional block 315 wherein the MIU telemetry device will look up the telephone number of the selected host. Control is then passed to functional block 320 wherein the dial-inbound MIU takes itself off-hook to dial the selected host (host 3, in this example)

Control is next transferred to decision block 325 wherein the dial-inbound MIU telemetry device looks for a busy signal, indicating that the number dialed is already engaged. If the line is busy, control is transferred to functional block 330 wherein the MIU will hang-up and wait a specified period before returning to decision block 310 to retry the call. Assuming no busy signal, control is transferred to functional block 335 wherein a timer is started and control passes to decision block 340. Decision block 340 checks the timer for the passage of a given interval of time, typically 45-60 seconds, and will transfer control to decision block 345 so long as the designated time interval has not expired. Decision block 345 checks the modem for indication that it has successfully connected to the host and will transfer control back to decision block 340 if a connection is not detected. Collectively, decision blocks 340 and 345 permit the telemetry device only a specified amount of time to connect to a host. Consequently, if after dialing the MIU does not establish a valid data connection with a host within a predetermined interval, then decision block 340 will transfer control to function block 330 to hang-up and retry the call later.

Assuming that a data connection is made with the selected host (host 3, in this example), decision block 345 will transfer control to function block 350 thereby enabling the host to instruct the dial-inbound MIU telemetry device 34 to interrogate a selected meter port and upload the reading as telemetry data to the on-line host.

As part of the initial configuring of the MIU, the telemetry device knows, via configuration data stored in its nonvolatile memory as part of its programming, the type of utility meter attached to each active meter port. Consequently, the MIU is able to electronically interrogate each utility meter so as to retrieve the reading shown on the meter's register. Via a high level command the host instructs the MIU to read a specific meter port, for example meter port 3, and the MIU will automatically select the appropriate serial communication protocol for the selected meter, interrogate that meter, and upload the readings as telemetry data to the on-line host.

Control then passes to functional block 355 wherein the MIU completes its telemetry procedures and disconnects itself from the subscriber telephone line, returning itself to an on-hook condition. The MIU then returns to the procedure depicted in the flow chart shown in FIG. 4A-4B.

Although the data received from the data activating signal by the in-bound telemetry device is used to determine which host needs an on-demand reading, the data can used for other purposes as well. For instance, the activating data signal can place the MIU in a test mode, or turn its operation on or off, or it may be employed as a security password. Alternately, instead of specifying a host, the data received can instruct the MIU to read a designated meter port of a plurality of ports. It is also possible that the data received as part of the activating data signal could be transferred from the MIU to another peripheral device.

Referring once again to FIG. 3, it is seen that the hardware structures for data activatable dial-inbound and dial-outbound telemetry devices are virtually identical while the majority of the remaining operational differences between these two telemetry devices lie in the program control of microcontroller U1. In both types of telemetry devices, the activating data signal provides a method for the activator (host) to send data to the activated telemetry device. While the dial-outbound device might receive data corresponding to an MIU meter port to open in one embodiment and the dial-inbound device might receive data as to which host to dial into in another embodiment, the program executed by the microcontroller which makes the device receptive to a data activation signal is substantially the same. Once data-activated, the operation of the two types of telemetry devices is different as depicted in flow charts shown in FIGS. 5 and 6, which are software procedures executed by microcontroller U1 for the dial-outbound and dial-inbound implementations, respectively. Consequently, if the data sent by the activator host to the telemetry device in the activating data signal were to include an indication of the activator's type (ie. dial-inbound or dial-outbound) then it is possible that the functionality of both a dial-inbound and a dial-outbound telemetry device could be incorporated into one common telemetry device design with both dial-inbound and dial-outbound capabilities. Alternatively, recalling that dial-outbound devices are activated while the telephone line is on-hook and dial-inbound devices are activated while the phone line is off-hook (or ringing), by observing the state of telephone line when the data activation signal arrives, the telemetry device will be able to determine if its mode of operation is to be dial-inbound or dial-outbound. Therefore, in one implementation, the telemetry device depicted in FIG. 2B is a hybrid MIU which incorporates the features of both dial-inbound and dial-outbound systems.

It should be noted that automatic meter reading systems represent only one application where telephone line telemetry devices and techniques are utilized. Those skilled in the art will appreciate that these same methods are equally suitable for use in a broad and diverse range of applications which employ remote monitoring techniques and devices. A partial list of other applications would include copy and vending machine monitors, industrial monitoring of remote processes (for instance, oil field flow systems) and remote monitoring of diesel generators or like industrial equipment. While the particular term, meter port, has been used herein, it should be understood that this term also includes other ports where consumption information is gathered or transferred.

While the above description sets forth a telemetry apparatus, it is clear that a method of operating the telemetry apparatus is also disclosed. More particularly, a method of operating a telemetry device which is coupled to a phone line at a remote location is disclosed. The telemetry device includes a plurality of meter ports which are coupled to respective meters. The method includes the step of receiving a data activating signal transmitted to the telemetry device over the phone line. The data activating signal indicates which of a plurality of different information transactions should be performed by the telemetry device as the designated information transaction. The method includes the step of determining from the data activating signal which of the plurality of different information transactions is the designated information transaction. The method further includes the step of reading information from a meter port. The method also includes the step of the telemetry device transmitting the information over the phone line to the host station. The reading and transmitting steps of the method carry out the designated information transaction. In one embodiment, the method includes the step of activating the telemetry device from an on-hook state to an off-hook state in response to reception of the data activating signal.

The foregoing has described a telemetry device which is capable of being on-demand activated wherein the telemetry device receives data as part of an activating signal. The data received by the telemetry device in the activating signal is used by the telemetry device to configure its response to the activating signal. The complexity of the telemetry device is reduced by using the modem which transmits consumption information to also receive the activating data signal. A dial-outbound MIU device is advantageously provided with a capability of being on-demand activated by a data signal wherein data received in the activating signal instructs the MIU to open one, or more, selected meter interface ports on the MIU. In another embodiment, a multiple host dial-inbound MIU device is provided with a capability of being on-demand activated by a data signal wherein data included in the activating signal instructs the MIU to call a specific host from a plurality of hosts. In another embodiment, a versatile telemetry device is provided with a data activation capability which incorporates the functionality of both a dial-inbound and a dial-outbound telemetry into one telemetry device.

While only certain preferred features of the invention have been shown by way of illustration, many modifications and changes will occur to those skilled in the art. For example, while common modem 60 both receives the data activating signal and transmits telemetry information to the host, the receive and transmit function can also be performed by separate receive and transmit circuits if desired in particular application. Moreover, while a multiple port MIU telemetry device embodiment is depicted and described, a multiple host telemetry device is not required to have multiple ports. Although one embodiment of the multiple host telemetry device includes a plurality of meters, each associated with a corresponding host, an MIU telemetry device with a single meter port is still capable of operating in a multiple host environment. For instance, an MELT telemetry device with only a single meter port can call into different hosts so as to make the consumption information available to different hosts for entirely different reasons. In keeping with its multiple host design, the MIU can have an independent appointment time with each host at a corresponding host telephone number. For example, a single port MIU connected to a water meter could be programmed to call the water company monthly (assuming a monthly billing cycle) and can also have a weekly appointment with a second host (e.g. a county water management center) to facilitate closer monitoring of water resource usage. It is, therefore, to be understood that the present claims are intended to cover all such modifications and changes which fall within the true spirit of the invention.

What is claimed is:

1. A telemetry device for collecting information at a remote location and transmitting the information over a phone line to a host station, the telemetry device comprising:

at least one meter port;

receiving means operable in a standby mode, wherein the telemetry device is in an on-hook state, for receiving a data activating signal transmitted over the phone line to the telemetry device, the data activating signal designating which one of a plurality of different information transactions should be performed by the telemetry device as the designated information transaction; and information transaction means responsive to the data activating signal received by said receiving means, the data activating signal being capable of conveying information data to instruct said information transaction means for performing the designated information transaction, the information transaction means including determining means, coupled to the receiving means, for determining from the data activating signal which of the plurality of different information transactions is the designated information transaction;

reading means, coupled to the at least one meter port, for reading information from a meter port; and transmitting means, coupled to the reading means, for transmitting the information over the phone line to a host station, such that the reading means and transmitting means perform the designated information transaction.

2. The telemetry device of claim 1 further comprising activating means for taking the telemetry device from an on-hook state to an off-hook state in response to reception of the data activating signal.

3. The telemetry device of claim 1 wherein the data activating signal is a multi-bit signal.

4. The telemetry device of claim 1 wherein the at least one meter port includes a plurality of meter ports and the data activating signal designates one of the plurality of meter ports as a designated port and the reading means reads information from the designated port.

5. The telemetry device of claim 1 wherein the data signal designates one of a plurality of host stations as a designated host station and the transmitting means transmits the information over the phone line to the designated host.

6. The telemetry device of claim 1 wherein the telemetry device is in an on-hook mode when the receiving means receives the data activating signal.

7. The telemetry device of claim 1 wherein the receiving means and the transmitting means include a shared modem which is operative in a first mode for receiving the data activating signal and which is operative in a second mode for transmitting the information over the phone line to the host station.

8. The telemetry device of claim 1 wherein the data activating signal is a caller ID signal.

9. A telemetry device for collecting information at a remote location and transmitting the information over a phone line to a host station, the telemetry device comprising:

a plurality of meter ports;

receiving means operable in a standby mode, wherein the telemetry device is in an on-hook state, for receiving a data activating signal transmitted over the phone line to the telemetry device, the data activating signal designating one of the plurality of meter ports as a designated meter port;

information transaction means responsive to the data activating signal received by said receiving means, the data activating signal being capable of conveying information data to instruct said information transaction means for performing an information transaction with information from the designated meter port, the information transaction means including determining means, coupled to the receiving means, for determining from the data activating signal which of the plurality of meter ports is the designated meter port;

reading means, coupled to the plurality of meter ports, for reading information from the designated meter port; and transmitting means, coupled to the reading means, for transmitting the information over the phone line to the host station.

10. The telemetry device of claim 9 further comprising activating means for taking the telemetry device from an on-hook state to an off-hook state in response to reception of the data activating signal.

11. The telemetry device of claim 9 wherein the data activating signal is a multi-bit signal.

12. The telemetry device of claim 9 wherein the telemetry device is in an on-hook mode when the receiving means receives the data signal.

13. The telemetry device of claim 9 wherein the receiving means and the transmitting means include a shared modem which is operative in a first mode for receiving the data activating signal and which is operative in a second mode for transmitting the information over the phone line to the host station.

14. The telemetry device of claim 9 wherein the data activating signal is a caller ID signal.

15. A telemetry device for collecting information at a remote location and transmitting the information over a phone line to one of a plurality of host stations, the telemetry device comprising:

at least one meter port;

receiving means operable in a standby mode, wherein the telemetry device is in an on-hook state for receiving a data activating signal transmitted over the phone line to the telemetry device, the data activating signal designating one of the plurality of host stations as a designated host station;

information transaction means responsive to the data activating signal received by said receiving means, the data activating signal being capable of conveying information data to instruct said information transaction means for conducting an information transaction with the designated host station, the information transaction means including determining means, coupled to the receiving means, for determining from the data activating signal which of the plurality of host stations is the designated host station;

reading means, coupled to the at least one meter port, for reading information from a meter port; and transmitting means, coupled to the reading means, for transmitting the information over the phone line to the designated host station.

16. The telemetry device of claim 15 further comprising activating means for taking the telemetry device from an on-hook state to an off-hook state in response to reception of the data activating signal.

17. The telemetry device of claim 15 wherein the data activating signal is a multi-bit signal.

18. The telemetry device of claim 15 wherein the transmitting means includes a dialer circuit for dialing the designated host station over the phone line.

19. The telemetry device of claim 15 wherein the telemetry device is in an on-hook mode when the receiving means receives the data activating signal.

20. The telemetry device of claim 15 wherein the receiving means and the transmitting means include a shared modem which is operative in a first mode for receiving the data activating signal and which is operative in a second mode for transmitting the information over the phone Line to the designated host station.

21. The telemetry device of claim 15 wherein the data signal is a caller ID signal.

22. A telemetry device for collecting information at a remote location and transmitting the information over a phone line to designated host stations of a plurality of host stations, the telemetry device comprising:

at least one meter port;

receiving means operable in a standby mode, wherein the telemetry device is in an on-hook state, for receiving a data activating signal transmitted over the phone line to the telemetry device, the data activating signal designating particular host stations of the plurality of host stations as designated host stations;

information transaction means responsive to the data activating signal received by said receiving means, the data activating signal being capable of conveying information data to instruct said information transaction means for conducting respective information transactions with the designated host stations, the information transaction means including determining means, coupled to the receiving means, for determining from the data activating signal which of the plurality of host stations are the designated host stations;

reading means, coupled to the at least one meter port, for reading information from a meter port; and transmitting means, coupled to the reading means, for transmitting the information over the phone line to the designated host stations in respective information transactions.

23. The telemetry device of claim 22 further comprising activating means for taking the telemetry device from an on-hook state to an off-hook state in response to reception of the data activating signal.

24. The telemetry device of claim 22 wherein the data activating signal is a multi-bit signal.

25. The telemetry device of claim 22 wherein the transmitting means includes a dialer circuit for dialing the designated host stations over the phone line.

26. The telemetry device of claim 22 wherein the telemetry device is in an on-hook mode when the receiving means receives the data activating signal.

27. The telemetry device of claim 22 wherein the receiving means and the transmitting means include a shared modem which is operative in a first mode for receiving the data activating signal and which is operative in a second mode for transmitting the information over the phone line to the designated host stations.

28. The telemetry device of claim 22 wherein the data signal is a caller ID signal.

29. A method of operating a telemetry device which is coupled to a phone line at a remote location, the telemetry device including a plurality of meter ports which are coupled to respective meters, the method comprising the steps of:

receiving, in a standby mode by the telemetry device in an on-hook state, of a data activating signal transmitted to the telemetry device over the phone line, the data activating signal indicating which of a plurality of different information transactions should be performed by the telemetry device as the designated information transaction;

determining from the data activating signal, received by said receiving step for conveying information data to instruct the telemetry device, which of the plurality of different information transactions is the designated information transaction;

reading information from a meter port; and transmitting, by the telemetry device, of the information over the phone line to the host station, the reading and transmitting steps carrying out the designated information transaction.

30. The method of claim 29 further comprising the step of activating the telemetry device from an on-hook state to an off-hook state in response to reception of the data activating signal.

31. The method of claim 29 wherein the data activating signal is a multi-bit signal.

32. The method of claim 29 wherein the information transactions include a telemetry transaction with a particular meter port of the plurality of meter ports.

33. The method of claim 29 wherein the information transactions include a telemetry transaction with a particular host station of a plurality of host stations.

34. A method of operating a telemetry device which is coupled to a phone line at a remote location, the telemetry device including a plurality of meter ports which are coupled to respective meters, the method comprising the steps of:

receiving, in a standby mode by the telemetry device in an on-hook state, of a data activating signal transmitted to the telemetry device over the phone line, the data signal activating designating one of the plurality of meter ports as a designated meter port;

the telemetry device determining from the data activating signal, received by said receiving step for conveying information data to instruct the telemetry device, which of the plurality of meter ports is the designated meter port;

reading, by the telemetry device, of information from the designated meter port; and transmitting, by the telemetry device, of the information over the phone line to a host station.

35. The method of claim 34 further comprising the step of activating the telemetry device from an on-hook state to an off-hook state in response to reception of the data activating signal.

36. The method of claim 34 wherein the data activating signal is a multi-bit signal.

37. The method of claim 34 wherein the telemetry device remains in an on-hook state during the receiving step.

38. The method of claim 34 wherein the receiving step and the transmitting step are performed by a common modem which operates in a first mode for receiving the data activating signal and which is operative in a second mode for transmitting the information over the phone line to a host station.

39. The method of claim 34 wherein the data activating signal is a caller ID signal.

40. A method of operating a telemetry device which is coupled to a phone line at a remote location for collecting information at the remote location and transmitting the information over a phone line to one of a plurality of host stations, the method comprising the steps of:

receiving, in a standby mode by the telemetry device in an on-hook state, of a data activating signal transmitted to the telemetry device over the phone line, the data signal designating one of the plurality of host stations as a designated host station;

the telemetry device determining from the data activating signal, received by said receiving step for conveying information data to instruct the telemetry device, which of the plurality of host stations is the designated host station;

reading, by the telemetry device, of information from a meter port; and transmitting, by the telemetry device, of the information over the phone line to the designated host station.

41. The method of claim 40 further comprising the step of activating the telemetry device from an on-hook state to an off-hook state in response to reception of the data activating signal.

42. The method of claim 40 wherein the data activating signal is a multi-bit signal.

43. The method of claim 41 further comprising the step of dialing, by the telemetry device, of the designated host station to establish a connection with the designated host station over the phone line.

44. The method of claim 40 wherein the telemetry device remains in an on-hook state during the receiving step.

45. The method of claim 40 wherein the receiving step and the transmitting step are performed by a common modem which operates in a first mode for receiving the data activating signal and which is operative in a second mode for transmitting the information over the phone line to the designated host station.

46. The method of claim 40 wherein the data signal is a caller ID signal.

47. A telemetry device for collecting information at a remote location and transmitting the information over a phone line to one of a plurality of host stations, the telemetry device comprising:

at least one meter port;

receiving means operable in a standby mode, wherein the telemetry device is in an on-hook state, for receiving a data activating signal transmitted by a host station over the phone line to the telemetry device to provide a received data signal, the received data signal designating one of the plurality of host stations as a designated host station;

a microprocessor responsive to the data activating signal received by said receiving means, the data activating signal being capable of conveying information data to instruct said microprocessor for processing the received data signal to determine which one of the plurality of host stations is the designated host station, the microprocessor reading information from a meter port; and activating means, coupled to the microprocessor, for taking the telemetry device from an off-hook state to an on-hook state in response to reception of the data activating signal to transmit the information over the phone line to the designated host station.

48. The telemetry device of claim 47 wherein the data activating signal is a multi-bit signal.

49. The telemetry device of claim 47 wherein the activating means includes dialing means for dialing the designated host station over the phone line when the phone line becomes available.

50. The telemetry device of claim 47 wherein the data activating signal is a caller ID signal.

51. A method of operating a telemetry device which is coupled to a phone line at a remote location for collecting information at the remote location and transmitting the information over a phone line to one of a plurality of host stations, the method comprising the steps of:

receiving, in a standby mode by the telemetry device in an on-hook state, of a data activating signal transmitted to the telemetry device over the phone line thus producing a received data signal, the received data signal designating one of the plurality of host stations as a designated host station;

determining from the received data signal, by the telemetry device, received by said receiving step for conveying information data to instruct the telemetry device, which of the plurality of host stations is the designated host station;

reading, by the telemetry device, of consumption information from a meter port; and activating the telemetry device to go from an on-hoop state to an off-hook state in response to reception of the data activating signal to transmit the information over the phone line to the designated host station.

52. The method of claim 51 further comprising the step of dialing, by the telemetry device, of the designated host station to establish a connection with the designated host station over the phone line.

53. The method of claim 51 wherein the data activating signal is a multi-bit signal.

54. The method of claim 51 wherein the data activating signal is a caller ID signal.

55. A telemetry device comprising:

a receiver for receiving a data activating signal over a telephone line, said receiver being operable in a standby mode wherein the telemetry device is in an on-hook state, the data activating signal designating which one of a plurality of different information transactions should be performed by the telemetry device as the designated information transaction;

an information processor responsive to the data activating signal received by said receiver, the data activating signal being capable of conveying information data to instruct said information processor for performing the designated information transaction; and a plurality of objects comprising plural meter ports or host stations selectable by said information processor in response to the data activating signal received by said receiver, the data activating signal being capable of conveying information sufficient to identify a selected one of said plurality of objects.

56. A telemetry device as recited in claim 55 wherein said receiver receives the data activating signal in the form of a multi-bit signal and said information processor decodes the multi-bit signal to identify the selected one of said plurality of objects.

57. A telemetry device as recited in claim 56 wherein said receiver receives the data activating signal in the form of an analog carrier modulated with digital data over the telephone line.

58. A telemetry device as recited in claim 56 wherein said receiver receives the data activating signal in the form of a frequency shift keying (FSK) transmission over the telephone line.

59. A telemetry device as recited in claim 56 wherein said receiver receives the data activating signal in the form of a caller ID transmission over the telephone line.

60. A telemetry device as recited in claim 55 wherein said receiver receives the data activating signal in the form of a sufficient number of states or values to convey information sufficient to identify the selected one of said plurality of objects and simultaneously instruct said information processor to use said receiver for information transactions in the active mode.

61. A telemetry device as recited in claim 55 wherein said information processor communicates via said receiver with the host station of the selected one of said plurality of objects after completion of the data activating signal using said receiver is in the active mode.

62. A telemetry device as recited in claim 61 wherein said information processor originates a telephone call to the host station using said receiver when the telephone line becomes available.

* * * * *